United States Patent
Petrohilos et al.

[11] 4,007,992
[45] Feb. 15, 1977

[54] LIGHT BEAM SHAPE CONTROL IN OPTICAL MEASURING APPARATUS

[75] Inventors: Harry G. Petrohilos, Yellow Springs; Francis M. Taylor, Xenia, both of Ohio

[73] Assignees: Techmet Company; Systems Research Laboratories, Inc., both of Dayton, Ohio

[22] Filed: June 2, 1975

[21] Appl. No.: 582,690

[52] U.S. Cl. .............................. 356/160; 250/571; 350/7; 356/199
[51] Int. Cl.² .................. G01B 11/04; G01B 11/10
[58] Field of Search ......... 250/559, 560, 561, 562, 250/563, 571, 572; 350/6, 7, 190; 356/159, 160, 199, 200

[56] References Cited
UNITED STATES PATENTS

| | | | |
|---|---|---|---|
| 2,812,685 | 11/1957 | Vossberg | 356/160 |
| 3,743,428 | 7/1973 | Brown | 356/160 |
| 3,905,705 | 9/1975 | Petrohilos | 356/160 |

*Primary Examiner*—John K. Corbin
*Assistant Examiner*—Richard A. Rosenberger
*Attorney, Agent, or Firm*—Jacox & Meckstroth

[57] ABSTRACT

A narrow collimated light beam, such as a laser beam, is directed towards a mirror which is rotated to effect rotary planar scanning or sweeping of a lens constructed to convert the rotary scanning beam into a parallel scanning beam. An article to be measured is positioned in the path of the parallel scanning beam at generally the focal point of the lens, and interruptions of the parallel scanning beam, as produced by the article, are sensed by a photodetector. The photodetector controls transmission of pulses or signals to means for counting pulses produced by a high frequency generator so that the counted pulses correspond to the dimension of the article at the plane of the parallel scanning beam. In this invention a lens is positioned in the path of the light beam and changes a narrow substantially round light beam into an elongate or substantially flat light beam which is scanned across an object for measurement thereof. The greatest dimension of the light beam is substantially normal to the direction of scan movement. Thus, if there should be irregularities or small particles of foreign material upon the surface of the object or adjacent thereto, the entire light beam is not completely interrupted by such particles or by such irregularities. Thus, a light beam is received by the photodetector in accordance with the average dimension or contour of the object at the measured portion thereof. Thus, the dimension of the object is measured without consideration of small irregularities or small or minute particles of foreign material or the like which may be present upon or adjacent the object at the measured portion thereof.

5 Claims, 7 Drawing Figures

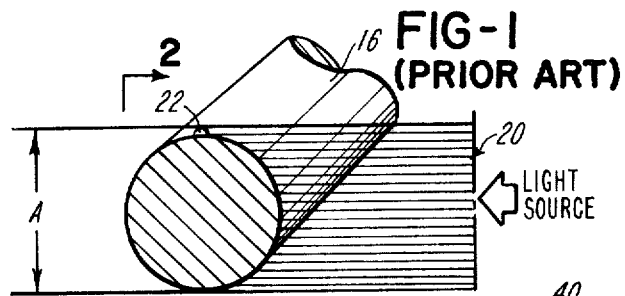
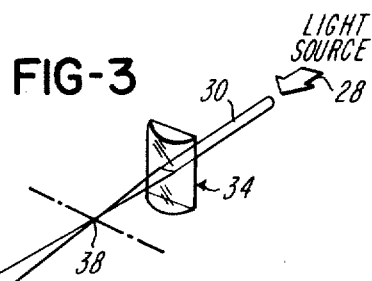
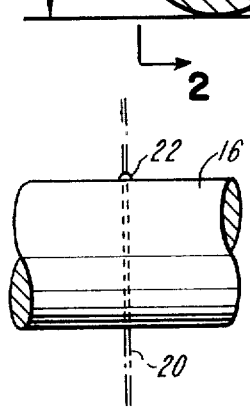
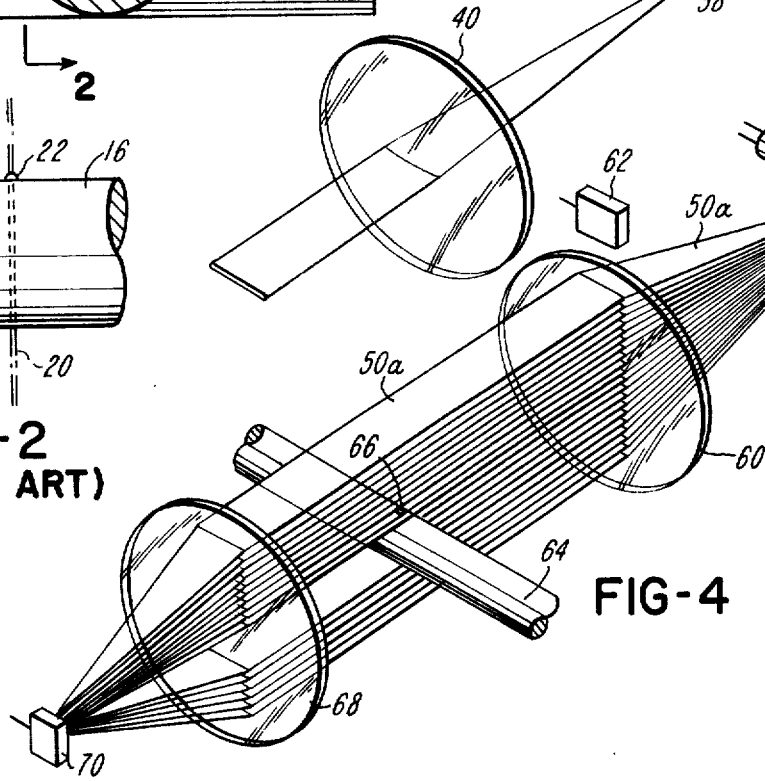
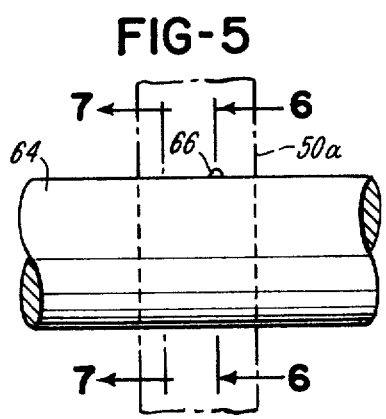
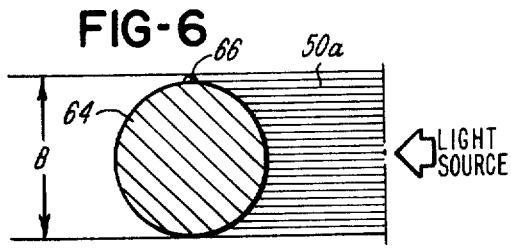
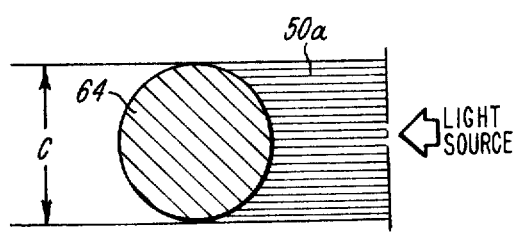

LIGHT BEAM SHAPE CONTROL IN OPTICAL MEASURING APPARATUS

BACKGROUND OF THE INVENTION

There have been a number of devices constructed for optically measuring a dimension of an object or the distance between two objects, and which use a scanning light beam from a collimated light source such as a laser. Some of the devices time the interruption of the scanning light beam as it is directed either across the object to be measured or across a reference area within the space to be measured between the objects. The apparatus disclosed in U.S. Pat. No. 3,765,774 uses a narrow light beam which scans an object or objects for measurement thereof or for measurement between objects. In some situations, the object scanned may have small or minute irregularities on the surface thereof or may have particles of foreign material which rest upon the object or which are closely adjacent the object. In regard to some types of objects or in regard to some types of environments or conditions, the dimension of an irregularity or a particle of foreign material may be at least as large as the dimension of a narrow scanning light beam. Thus, a conventional type of narrow scanning light beam senses the particle or irregularity as an edge or portion of the object measured, and a true and accurate dimension measurement of an object or the spacing between objects is not obtained.

It is a purpose of this invention to provide means by which the shape of a light beam can be changed so that when the light beam is scanned across an object, an average contour is sensed and particles of foreign material or irregular edge surfaces do not interfere with the measurements of the apparatus.

Another object of this invention is to provide such means which can be easily and readily installed in existing scanning and measuring apparatus.

Another object of this invention is to provide such means by which a desired width dimension of a scanning beam can be readily obtained.

Other objects and advantages of this invention reside in the construction or selection of parts, the combination thereof, and the mode of operation, as will become more apparent from the following description.

SUMMARY OF THE INVENTION

A collimated light beam passes through a cylindrical lens which changes the geometry thereof from a substantially round beam of small diameter to an elongate shape which is generally flat or rectangular, having a thickness dimension substantially equal to said small diameter and a width dimension normal to the thickness dimension and considerably greater than said thickness dimension. The elongate light beam is then scanned by the use of a rotating mirror or the like and provides means for accurate measurement of a dimension of an object even though the object may have surface irregularities or particles of foreign material thereupon or adjacent thereto.

BRIEF DESCRIPTION OF THE DRAWINGS

FIG. 1 is a perspective view illustrating measurement of an object by the use of a substantially round small diameter scanning light beam which moves in a direction substantially normal to the axis of the object measured. This view illustrates a problem which exists in the use of such a light beam when there is an irregularity on the surface of the object measured or when a particle of foreign material rests upon the object at the position of measurement.

FIG. 2 is a side elevational view, taken substantially on line 2—2 of FIG. 1.

FIG. 3 is a perspective view illustrating the principle involved in this invention in changing a substantially round small diameter light beam into an elongate substantially flat light beam.

FIG. 4 is a perspective view illustrating structure which scans an elongate substantially flat light beam in measuring a dimension of an object.

FIG. 5 is an elevational view illustrating measurement of a dimension of an object by a scanning light beam of the type shown in FIG. 4. This view shows a particle of foreign material upon the object at the position of measurement.

FIG. 6 is a sectional view, taken substantially on line 6—6 of FIG. 5.

FIG. 7 is a sectional view taken substantially on line 7—7 of FIG. 5.

DETAILED DESCRIPTION OF THE INVENTION

An object, such as an object 16, shown in FIG. 1, may have a dimension thereof measured by use of a conventional narrow, substantially round, scanning light beam 20 which scans in a direction substantially normal to the dimension measured. The object 16 may be a continuous object such as a rod or the like which moves axially and the diameter thereof is continuously measured by the use of a scanning light beam which scans in a direction normal to the axis of the object 16. The object 16 is shown as having a particle 22 of foreign material resting upon the surface thereof at the location of measurement by the use of the very small diameter scanning light beam 20, as illustrated in FIGS. 1 and 2. The conventional scanning light beam 20 shown in FIGS. 1 and 2 has a dimension which may be substantially the same or less than a dimension of the particle 22. Thus, as the light beam 20 scans the object 16, for measurement of the diameter thereof, the path of the scanning light beam 20 is completely interrupted by the particle 22. Therefore, the scanning light beam 20 senses the diameter of the object 16 as being a dimension A, at the location of the particle 22, as the dimension of the particle 22 is added to the diameter dimension. Thus, the scanning light beam 20 creates a signal which indicates a diameter dimension equal to that of the true diameter dimension of the object 16, plus the dimension of the particle of foreign material 22. Thus, the diameter dimension of the object 16 is not accurately measured at the location of the particle 22. For this reason, a conventional narrow substantially round light beam such as the light beam 20 is not capable of accurate measurement of a dimension of the object at the location of a particle of foreign material.

In this invention means are provided by which a very small substantially round light beam is changed to an elongate substantially flat light beam.

FIG. 3 illustrates the principle involved in this invention. A light source 28 provides a very narrow collimated light beam 30 which is substantially round in cross section. A cylindrical lens 34 is positioned in the path of the light beam 30. As the light beam 30 passes through the cylindrical lens 34, the light beam 30 converges to a point 38 which is the focal point of the cylindrical lens 34. Then the light beam 30 is shown as diverging to a lens 40, which also has its focal point at the point 38, causing rays of light to move therefrom in a parallel manner.

FIG. 4 shows a narrow substantially round light beam 50 which is similar to the light beam 30 but which is shown as first traveling substantially vertically. A cylindrical lens 54, similar to the lens 34, is positioned in the path of the light beam 50. The cylindrical lens 54 has a substantially flat surface, which is substantially normal to the path of the light beam 50, and an opposed arcuate surface. The light beam 50 is thus changed to an elongate substantially flat light beam 50a, as shown, having a thickness dimension substantially equal to the diameter of the light beam 50 and a width dimension which converges in a direction from the lens 54. The cylindrical lens 54 is shown as being a positive cylindrical lens. However, a negative cylindrical lens also produces a desired elongate substantially flat light beam.

A rotating mirror 56, which has a very minimum thickness dimension and which has opposed reflective surfaces, is rotated about an axis which is normal to the direction of travel of the light beam 50a. The axis of rotation of the mirror 56 is located substantially at the focal point of the cylindrical lens 54. Thus, the light beam 50a leaving the lens 54 is substantially a point when it reaches the mirror 56. Any suitable motor means 58 serves to rotate the mirror 56. The beam of light 50a is reflected from the rotating mirror 56, and the beam of light 50a rotatively scans at right angles to the axis of rotation of the mirror 56.

A lens 60 is positioned so that the focal point thereof is located at the axis of rotation of the mirror 56, and the scanning light beam 50a passes through the lens 60. The light beam 50a is shown diverging as it travels from the mirror 56 to the lens 60. However, the configuration of the lens 60 is such that all the rays of light traveling therethrough are caused to travel therefrom along parallel lines. Thus, the light beam 50a traveling from the lens 60 is substantially rectangular in cross section, having a very small thickness dimension, substantially equal to the diameter of the beam 50 discharged from the light source, and a width dimension, which is considerably greater than the thickness dimension.

The rotating mirror 56 causes the light beam 50a to scan in a circular manner, normal to the axis of rotation of the mirror 56. As the light beam 50a scans downwardly, the beam 50a approaches the lens 60 and strikes a photodetector 62, which provides a signal to suitable circuits, not shown.

As the scanning light beam 50a travels through the lens 60, the light beam 50a travels to an object or article 64 for measurement of a dimension thereof which is normal to the path of the light beam 50a. Herein the object 64 is shown as being a continuous rod which moves axially. However, any other object or objects may be measured by the apparatus of this invention. The width dimension of light beam 50a is normal to the direction of scanning movement thereof. The upper edge or surface of the object 64 is substantially normal to the scanning movement of the light beam 50a. A particle 66 of foreign material is shown upon the object 64 at the position measured. Thus, as illustrated in FIG. 6, the diameter of the object 64 plus the height of the particle 66 is equal to a dimension B. As the beam 50a scans downwardly across the object 64, the width of the beam 50a is greater in magnitude than any individual particle 66 of foreign material upon the surface of the object 64 or adjacent thereto. Thus, only a portion of the light beam 50a is interrupted by the particle 66, and a major portion of the light beam 50a passes the particle 66 at the upper edge surface of the object 64. Thus, the light beam 50a senses the diameter of the object 64 as being a dimension C, shown in FIG. 7, rather than the dimension B, at the location of the particle 66. The portion of the light beam 50a which travels through the lens 60 and moves past the object 64 also travels through a condensing lens 68 and travels to a photodetector member 70 and is sensed thereby.

As the beam 50a scans downwardly past the upper edge of the article 64, the beam 50a is interrupted by the object 64 and is prevented from movement therebeyond. Thus, during the downward scan movement after the beam 50a passes the upper edge of the article 64, the beam 50a does not again travel to the lens 68 and the photodetector 70 until the scanning beam 50a moves downwardly to the lower edge of the object 64. Thus, the path of the beam 50a continues on from the lower edge of the object 64, through the lens 68 and to the photodetector 70. Therefore, the position of the lower edge of the object 64 is sensed. Any particle of foreign material on or adjacent the lower surface or edge of the object 64, or any surface irregularity does not prevent the light beam 50a from passing the location of the particle or irregularity. Thus, due to the fact that the width of the beam 50a is greater than a dimension of any single particle of foreign material and is greater than the dimension or irregularities on the surface of the object 64, an accurate dimension or an accurate average dimension is measured by the apparatus of this invention.

Suitable electrical circuitry, not shown, is employed in association with the rotation of the mirror 56 and in association with the photodetectors 62 and 70. Such circuitry may, for example, be similar to that shown in U.S. Pat. No. 3,765,774. Preferably, the circuitry includes means for generating pulses, means for counting pulses, and means for indicating a measurement determined by the number of pulses counted during a given scan movement.

When the light beam 50a scans downwardly and engages the photodetector 62, the beam 50a energizes the photodetector 62 and a pulse or signal is transmitted to a portion or portions of the circuitry to commence a pulse counting operation, in the manner disclosed in said U.S. Pat. No. 3,765,774. The beam 50a then scans through the lens 60 across the object 64. During the portion of each scan cycle in which the light beam 50a engages the object 64 a number of pulses are counted to represent the diameter dimension of the object 64. The measurement may be indicated and/or displayed in any suitable manner, as disclosed in said patent.

Although the preferred embodiment of the apparatus of this invention has been described, it will be understood that within the purview of this invention various changes may be made in the form, details, proportion and arrangement of parts, the combination thereof, and mode of operation, which generally stated consist in apparatus as defined in the appended claims.

The invention having thus been described, the following is claimed:

1. In optical measuring apparatus for measuring an object of the type having a light source to produce a collimated substantially round light beam of small diameter, means for rotating the light beam about a predetermined axis to scan the light beam, means for converting the rotating scanning light beam into a parallel scanning light beam, and photodetector means for sensing the parallel scanning light beam, the improvement for providing average contour sensing in an environment in which irregular surfaces are present on the object measured comprising a cylindrical lens positioned between the light source and the means for rotating the light beam, the light beam passing through the cylindrical lens, changing the shape of the light beam from a substantially round light beam into a light beam having an elongate shape, the light beam having a major dimension normal to the direction of scan movement of the light beam.

2. The apparatus of claim 1 in which the cylindrical lens is a positive cylindrical lens.

3. In optical measuring apparatus for measuring an object of the type having a light source to produce a small collimated substantially round light beam, means for rotating the light beam about a predetermined axis to scan the light beam, means for converting the rotating scanning light beam into a parallel scanning light beam, the improvement for providing average contour sensing in an environment in which irregular surfaces are present on the object measured comprising optical means positioned between the light source and the means for rotating the light beam, the light beam passing through the optical means, the optical means changing the small collimated substantially round light beam into a light beam which is elongate and which has a major dimension and a minor dimension, said means scanning the light beam in a direction normal to the major dimension of the light beam.

4. The apparatus of claim 3 in which the optical means is a cylindrical lens and has a focal point at the axis of rotation of the means for rotating the light beam.

5. In optical measuring apparatus for measuring an object of the type having a light source to produce a small collimated substantially round light beam, and means for rotating the light beam about a predetermined axis to scan the light beam, the improvement for providing average contour sensing in an environment in which irregular surfaces are present on the object measured comprising lens means within the path of the light beam, the lens means elongating the shape of the light beam as the light beam travels therethrough, and means for converting the rotating scanning light beam into a parallel scanning light beam having a major dimension normal to the direction of scan movement.

* * * * *